United States Patent
Manabe

(10) Patent No.: US 9,236,033 B2
(45) Date of Patent: Jan. 12, 2016

(54) COLOR PROCESSING APPARATUS AND COLOR PROCESSING METHOD

(71) Applicant: CANON KABUSHIKI KAISHA, Tokyo (JP)

(72) Inventor: Yoshihiro Manabe, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 78 days.

(21) Appl. No.: 13/866,868

(22) Filed: Apr. 19, 2013

(65) Prior Publication Data

US 2013/0307865 A1   Nov. 21, 2013

(30) Foreign Application Priority Data

May 16, 2012   (JP) ................................. 2012-112686

(51) Int. Cl.
  *G09G 5/30* (2006.01)
  *G01J 3/46* (2006.01)
  *H04N 9/64* (2006.01)
  *G09G 3/20* (2006.01)

(52) U.S. Cl.
  CPC . *G09G 5/30* (2013.01); *G01J 3/462* (2013.01); *G01J 3/463* (2013.01); *G09G 3/2003* (2013.01); *H04N 9/64* (2013.01); G09G 2320/028 (2013.01); G09G 2320/0606 (2013.01); G09G 2320/0666 (2013.01); G09G 2354/00 (2013.01)

(58) Field of Classification Search
  CPC ......... G09G 5/30; G09G 3/2003; G01J 3/463; H04N 9/64
  See application file for complete search history.

(56) References Cited

U.S. PATENT DOCUMENTS

| | | | |
|---|---|---|---|
| 7,394,469 B1 * | 7/2008 | Liu et al. ...................... | 345/594 |
| 2007/0247647 A1 | 10/2007 | Pettigrew et al. | |
| 2009/0201309 A1 * | 8/2009 | Demos ......................... | 345/589 |
| 2011/0069332 A1 | 3/2011 | Katayama | |
| 2012/0075645 A1 | 3/2012 | Katayama | |
| 2012/0081279 A1 * | 4/2012 | Greenebaum et al. ........ | 345/156 |
| 2012/0096380 A1 * | 4/2012 | Wagner ........................ | 715/771 |

FOREIGN PATENT DOCUMENTS

| | | |
|---|---|---|
| JP | 2002-351447 A | 12/2002 |
| JP | 2003-250058 A | 9/2003 |

(Continued)

OTHER PUBLICATIONS

"Microsoft Windows 7", released by Microsoft Corporation, in 2009.*

(Continued)

*Primary Examiner* — Xiao Wu
*Assistant Examiner* — Chong Wu
(74) *Attorney, Agent, or Firm* — Fitzpatrick, Cella, Harper & Scinto

(57) ABSTRACT

A display controller displays, on a display device, a color to be adjusted used to adjust a display color, and a plurality of candidate colors which define a first color range including the color to be adjusted, all of which are instructed by a user. A selector selects one of the plurality of candidate colors based on a user instruction. The display controller displays the selected candidate color as the color to be adjusted on the display device, and also displays, on the display device, a plurality of candidate colors which define a second color range including the color to be adjusted. The second color range is narrower than the first color range.

8 Claims, 18 Drawing Sheets

(56) References Cited

FOREIGN PATENT DOCUMENTS

| JP | 2006-203622 A | 8/2006 |
| JP | 2010-272910 A | 12/2010 |
| JP | 2011-515894 A | 5/2011 |
| JP | 2012-60590 A | 3/2012 |
| WO | 2009/102400 A1 | 8/2009 |

OTHER PUBLICATIONS

Chinese Office Action dated May 5, 2015 issued in corresponding Chinese Patent Application No. 201310177628.4.
Brundage, Barbara, "Photoshop Elements 3, The Missing Manual", Dec. 31, 2005, O'Reilly Media, pp. 174 to 176.
European Office Action dated Jul. 30, 2015 for counterpart EP 13167609.0.

* cited by examiner

F I G. 8
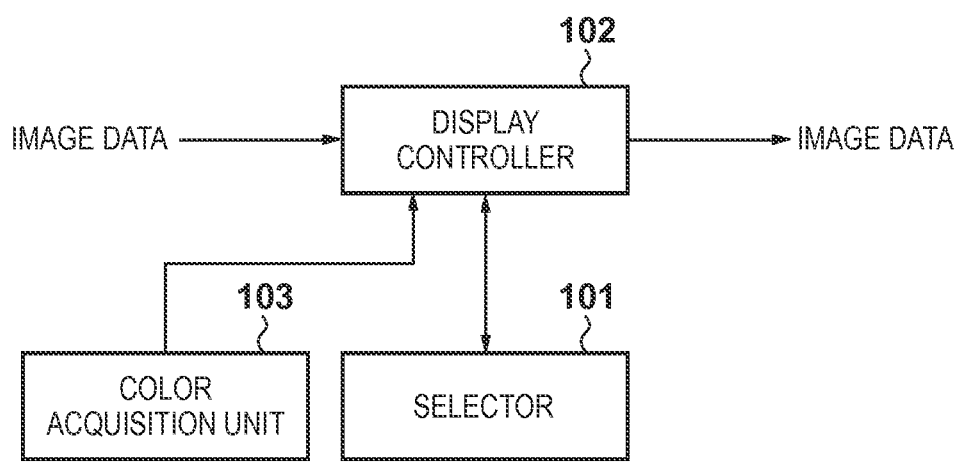

F I G. 10
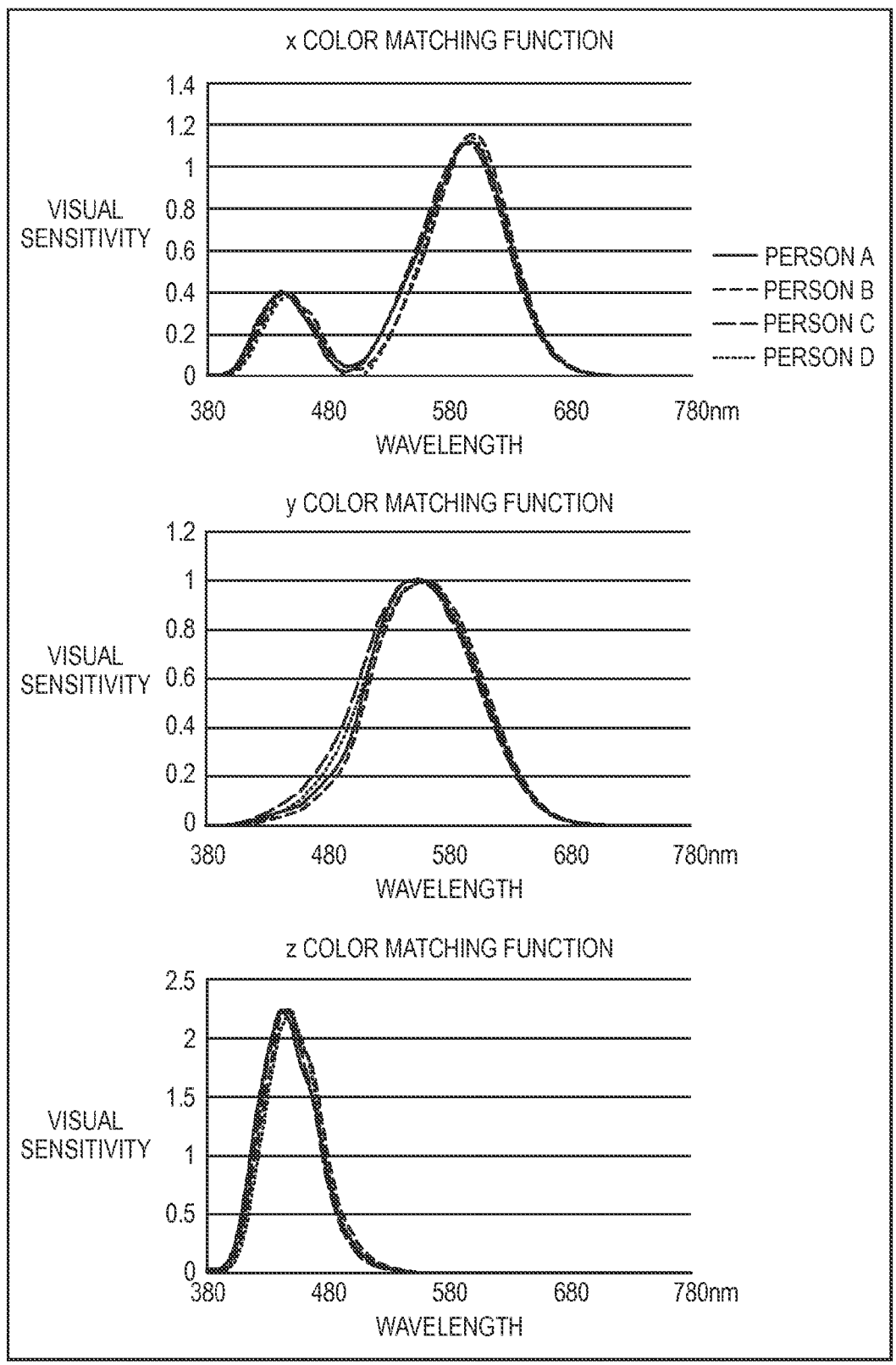

FIG. 14

| x COLOR MATCHING FUNCTION | | | |
|---|---|---|---|
| λ[nm] \ VIEWING ANGLE | 2° | 4° | 10° |
| 380 | xxx | xxx | xxx |
| 390 | xxx | xxx | xxx |
| 400 | xxx | xxx | xxx |
| ⋮ | ⋮ | ⋮ | ⋮ |
| 770 | xxx | xxx | xxx |
| 780 | xxx | xxx | xxx |

| y COLOR MATCHING FUNCTION | | | |
|---|---|---|---|
| λ[nm] \ VIEWING ANGLE | 2° | 4° | 10° |
| 380 | yyy | yyy | yyy |
| 390 | yyy | yyy | yyy |
| 400 | yyy | yyy | yyy |
| ⋮ | ⋮ | ⋮ | ⋮ |
| 770 | yyy | yyy | yyy |
| 780 | yyy | yyy | yyy |

| z COLOR MATCHING FUNCTION | | | |
|---|---|---|---|
| λ[nm] \ VIEWING ANGLE | 2° | 4° | 10° |
| 380 | zzz | zzz | zzz |
| 390 | zzz | zzz | zzz |
| 400 | zzz | zzz | zzz |
| ⋮ | ⋮ | ⋮ | ⋮ |
| 770 | zzz | zzz | zzz |
| 780 | zzz | zzz | zzz |

# COLOR PROCESSING APPARATUS AND COLOR PROCESSING METHOD

BACKGROUND OF THE INVENTION

1. Field of the Invention

The present invention relates to a color processing apparatus and color processing method and, more particularly, to a color processing apparatus and color processing method required for color adjustment of a display device.

2. Description of the Related Art

Various methods of adjusting colors of a display device such as a monitor or projector are known. These color adjustment methods include a method of directly adjusting RGB values, a method of adjusting hue, lightness, and saturation values, and the like. For example, Japanese Patent Laid-Open No. 2003-250058 (literature 1) discloses a technique for respectively providing adjustment values to lightness, saturation, and hue values of a target color since it is difficult to adjust colors when hue, saturation, and lightness values are independently adjusted, that is, a technique for adjusting 9 (=3×3) types of parameters.

These color adjustment methods are used not only for the purpose of adjustment of colors of a display device to desired colors by the user but also in an operation for matching appearances of a display device and, for example, a printed matter (to be referred to as a "color matching operation" hereinafter). Japanese Patent Laid-Open No. 2006-203622 (literature 2) discloses a color adjustment technique including a color matching operation. That is, color matching properties are stored based on user's color matching experiments, and a color matching property corresponding to user identification information is selected to execute color conversion. Literature 2 describes a method of selecting a color patch of a desired color from a plurality of color patches, and conducting color adjustment in addition to the aforementioned color adjustment method.

However, the method of adjusting parameters such as RGB values and lightness, hue, and saturation values, as described in literature 1, allows higher degrees of freedom for the user, but it is difficult to judge parameters to be adjusted and their degrees of adjustment, resulting in troublesome color adjustment. Furthermore, even when a parameter is designated, it is difficult to judge whether or not that value is optimal.

Also, the method of selecting a color patch from a plurality of color patch allows the user to select a color patch close to a desired color from presented color patches, but the user cannot often select the desired color itself. As a result, in order to obtain a desired color adjustment result, the user has to adjust parameters such as RGB values and hue, lightness, and saturation values, thus posing the same problem as above.

SUMMARY OF THE INVENTION

In one aspect, a color processing apparatus for performing an adjustment of display color of a display device, the apparatus comprising: a display controller configured to display, on the display device, a target color to be adjusted, which can be designated by a user, and a plurality of candidate colors that may be selected by a user in preference to the target color, which candidate colors define a first color range including the target color to be adjusted; and a selector configured to select one of the plurality of candidate colors based on a user instruction, wherein the display controller displays, subsequent to selection of one of the candidate colors, on the display device a further plurality of candidate colors which define a second color range including the selected candidate color as a second target color to be adjusted, and wherein the second color range is narrower than the first color range.

According to the aspect, adjustment of display colors of a display device is facilitated.

Further features of the present invention will become apparent from the following description of exemplary embodiments with reference to the attached drawings.

BRIEF DESCRIPTION OF THE DRAWINGS

FIG. 8 is a block diagram for explaining the functional arrangement of color processing associated with color adjustment according to the second embodiment.

FIG. 10 shows representative color matching functions.

FIG. 14 shows color matching functions according to viewing angles.

DESCRIPTION OF THE EMBODIMENTS

Color processing associated with a color processing apparatus and color processing method according to embodiments of the present invention will be described in detail hereinafter with reference to the drawings.

First Embodiment

[Arrangement of Apparatus]

Figure 1:
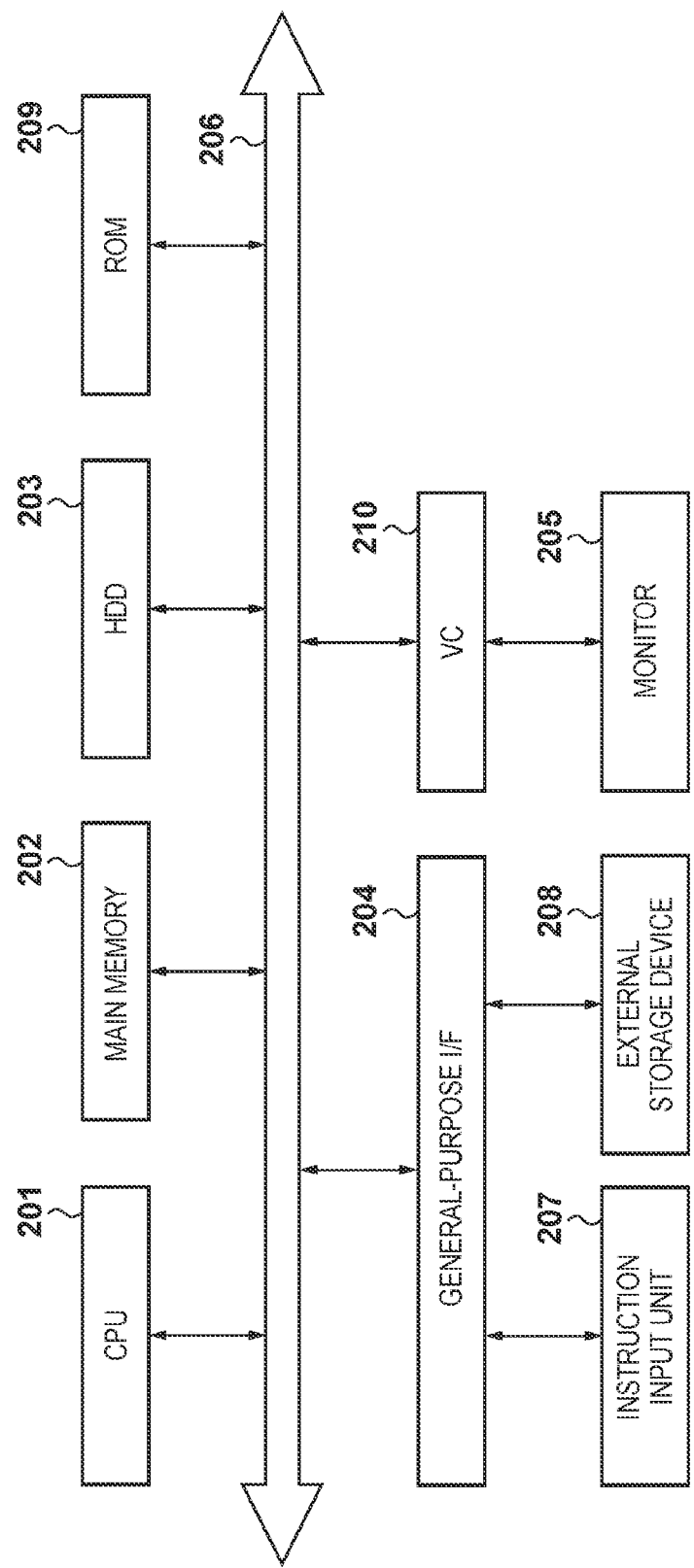
FIG. 1 is a block diagram showing the arrangement of a color processing apparatus according to the first embodiment.

The arrangement of a color processing apparatus according to the first embodiment will be described below with reference to the block diagram shown in FIG. 1.

A microprocessor (CPU) 201 executes programs stored in a read only memory (ROM) 209 and a hard disk drive (HDD) 203 using a main memory 202 such as a random access memory (RAM) as a work memory, and controls units to be described later through a system bus 206. Note that the ROM 209 and HDD 203 store programs and various data required to implement color processing to be described later.

An instruction input unit 207, such as a keyboard and mouse, and an external storage device 208, such as a USB memory, memory card, optical disk drive, or hard disk drive, are connected to a general-purpose interface (I/F) 204, such as USB (Universal Serial Bus) or IEEE1394. A monitor 205 as a display device connected to a video card (VC) 210 which provides an interface such as HDMI (High-Definition Multimedia Interface) displays a user interface (UI) and information indicating intermediate processing results and processing results under the control of the CPU 201.

For example, the CPU 201 loads an application program (AP) stored in the ROM 209, HDD 203, or external storage device 208 onto a predetermined area of the main memory 202 in accordance with a user instruction input via the instruction input unit 207. Then, the CPU 201 executes the AP, and displays the UI on the monitor 205 according to the AP.

Next, the CPU 201 loads various data stored in the HDD 203 or external storage device 208 onto a predetermined area of the main memory 202 according to a user operation on the UI. Then, the CPU 201 applies predetermined calculation processing to the data loaded on the main memory 202 according to the AP. Then, the CPU 201 displays the calculation processing result on the monitor 205 or stores the calculation processing result in the HDD 203 or external storage device 208 according to a user operation on the UI.

Note that the CPU 201 can also exchange programs, data, and calculation processing results with a server apparatus on a network via a network I/F (not shown) connected to the system bus 206. When the Internet is used as a network, the CPU 201 can download programs and various data from a specific homepage and can acquire them in the form of attached files to e-mail messages.

[GUI]

When the CPU 201 begins to execute an AP associated with color adjustment, it displays an application window (to be referred to as an AP window hereinafter) on the monitor 205 as a graphical user interface (GUI).

Figure 2:
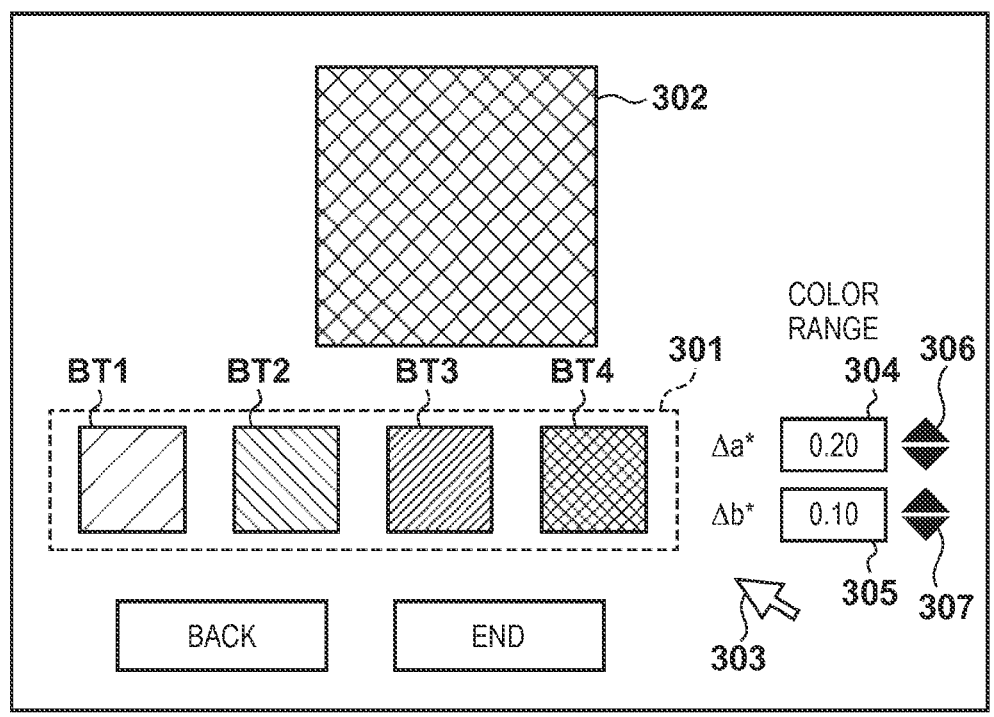
FIG. 2 is a view showing an example of an AP window (GUI).

FIG. 2 shows an example of the AP window (GUI). On a candidate section 301 of the AP window, candidate colors BT1 to BT4 used to adjust display colors on the monitor 205 are arranged. When the user selects one of candidate colors to be adjusted, the selected color (to be referred to as a "color to be adjusted" hereinafter) is displayed on a selected color window 302, and candidate colors BT1 to BT4 close to the color to be adjusted are arranged on the candidate section 301. As will be described in detail later, after the user selects the color to be adjusted, he or she can adjust the color to be adjusted to a desired display color by selecting or repetitively selecting the color arranged on the candidate section 301.

Note that candidate colors to be adjusted can be set by various methods. For example, as candidate colors to be adjusted, memory colors, colors having saturation S=100 and lightness B=100 of six hues (red, yellow, green, cyan, blue, magenta), and colors having HSB values set by the user can be used. Alternatively, colors selected from color pickers, Web colors, PANTONE® colors, and the like may be used as candidate colors to be adjusted. When only one candidate color is to be adjusted, candidate colors to be adjusted need not be selected, and a color to be adjusted is arranged on the selected color window 302, and candidate colors BT1 to BT4 are arranged on the candidate section 301 from the very beginning. Also, the number of candidate colors to be adjusted is not limited to four, and an arbitrary number of colors may be used as long as they can be displayed on the GUI.

After selection of the color to be adjusted, when the user moves a mouse cursor over the candidate colors BT1 to BT4, one of the candidate colors BT1 to BT4 pointed by the mouse cursor 303 is displayed on the selected color window 302. Then, when the user clicks (selects) one of the candidate colors BT1 to BT4, next candidate colors BT1 to BT4 are displayed on the candidate section 301 based on information of the selected color.

If a desired color is not included in the candidate section 301, the user presses a "back" button or adjusts relative distances $\Delta a^*$ and $\Delta b^*$ of colors between candidate colors using text boxes 304 and 305 so as to change candidate color ranges. Also, the user can adjust the distances $\Delta a^*$ and $\Delta b^*$ by operating spin buttons 306 and 307 displayed beside the text boxes 304 and 305. That is, the text boxes 304 and 305 and spin buttons 306 and 307 function as an input section which allows the user to input chromaticity ranges.

Figure 3A:
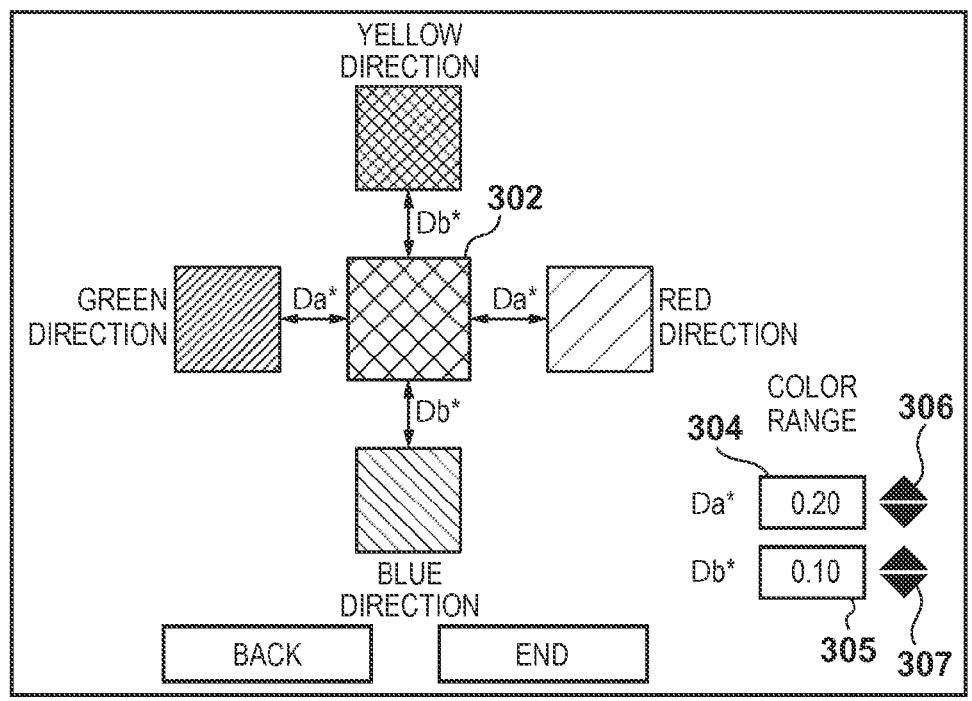
FIGS. 3A and 3B are views showing examples of other GUIs.
Figure 3B:
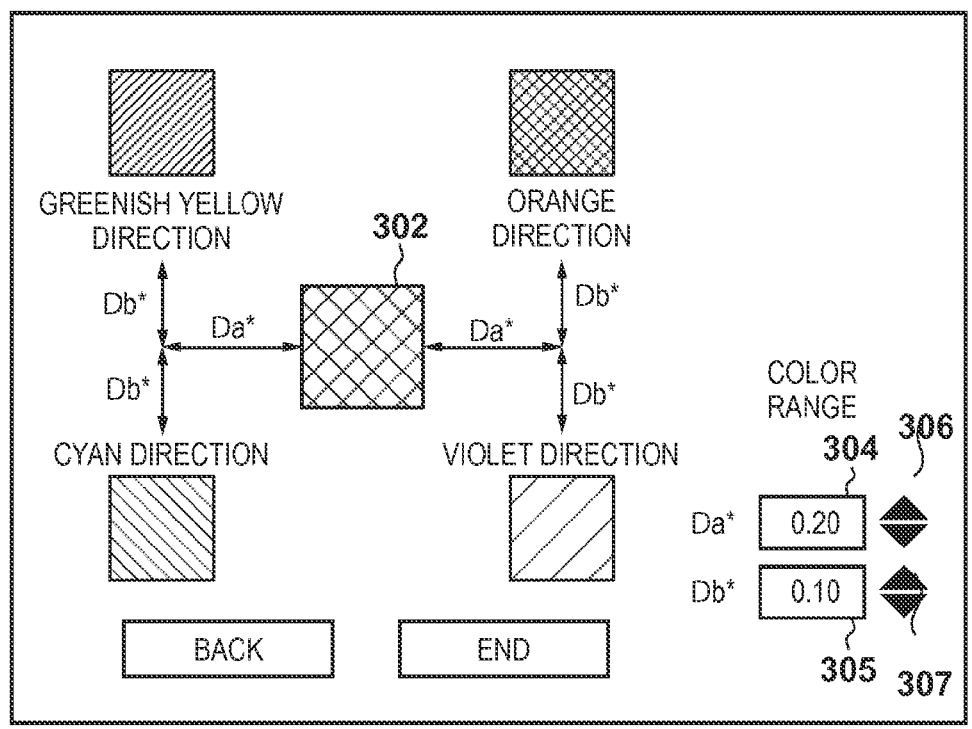

In this manner, the user repeats selection of the candidate color and adjustment of the distances $\Delta a^*$ and $\Delta b^*$ until a desired color is displayed on the selected color window 302. When the desired color is displayed on the selected color window 302, the user presses an "end" button. Note that the GUI shown in FIG. 2 is an example, and any other GUIs may be used as long as the candidate colors can be displayed and selected, the selected color can be displayed, and the distances $\Delta a^*$ and $\Delta b^*$ can be adjusted. FIGS. 3A and 3B show other examples of GUIs.

FIG. 3A shows a GUI on which candidate colors are arranged in four directions to have the selected color window 302 as the center. That is, if chromaticity values of the selected color are (a0, b0), this GUI has a relationship of a color (a0+$\Delta$a, b0) in a red direction, a color (a0, b0+$\Delta$b) in a yellow direction, a color (a0−$\Delta$a, b0) in a green direction, and a color (a0, b0−$\Delta$b) in a blue direction. Also, the GUI shown in FIG. 3B has a relationship of a color (a0+$\Delta$a, b0+$\Delta$b) in an orange direction, a color (a0−$\Delta$a, b0+$\Delta$b) in a greenish yellow direction, a color (a0−$\Delta$a, b0−$\Delta$b) in a cyan direction, and a color (a0+$\Delta$a, b0−$\Delta$b) in a violet direction. Of course, a layout of candidate colors as a combination of FIGS. 3A and 3B is available.

[Functional Arrangement]

Figure 4:
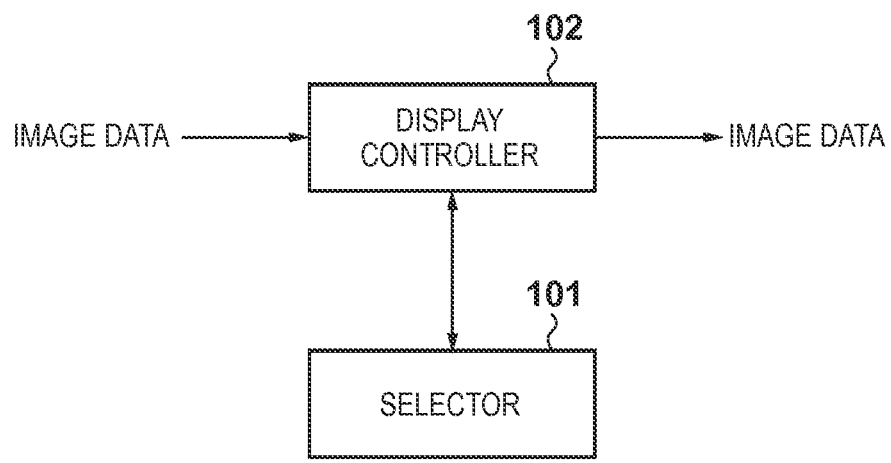
FIG. 4 is a block diagram for explaining the functional arrangement of color processing associated with color adjustment.

The functional arrangement of color processing associated with color adjustment will be described below with reference to the block diagram shown in FIG. 4. Note that the arrangement shown in FIG. 4 can be implemented when the CPU 201 executes the color adjustment AP.

A display controller 102 displays candidate colors to be adjusted expressed by input image data on the GUI shown in FIG. 2 or FIG. 3A or 3B. The user designates a display color of the monitor 205 as a color to be adjusted by operating a selector 101 configured by the GUI and instruction input unit 207, inputs selection information of the color displayed on the GUI, and changes values of color ranges. Next, the display controller 102 executes processing to be described below based on the designated color to be adjusted, input selection information, changed values of the color ranges, and button operation (to be referred to as a "user input" hereinafter).

[Color Adjustment]

Figure 5:
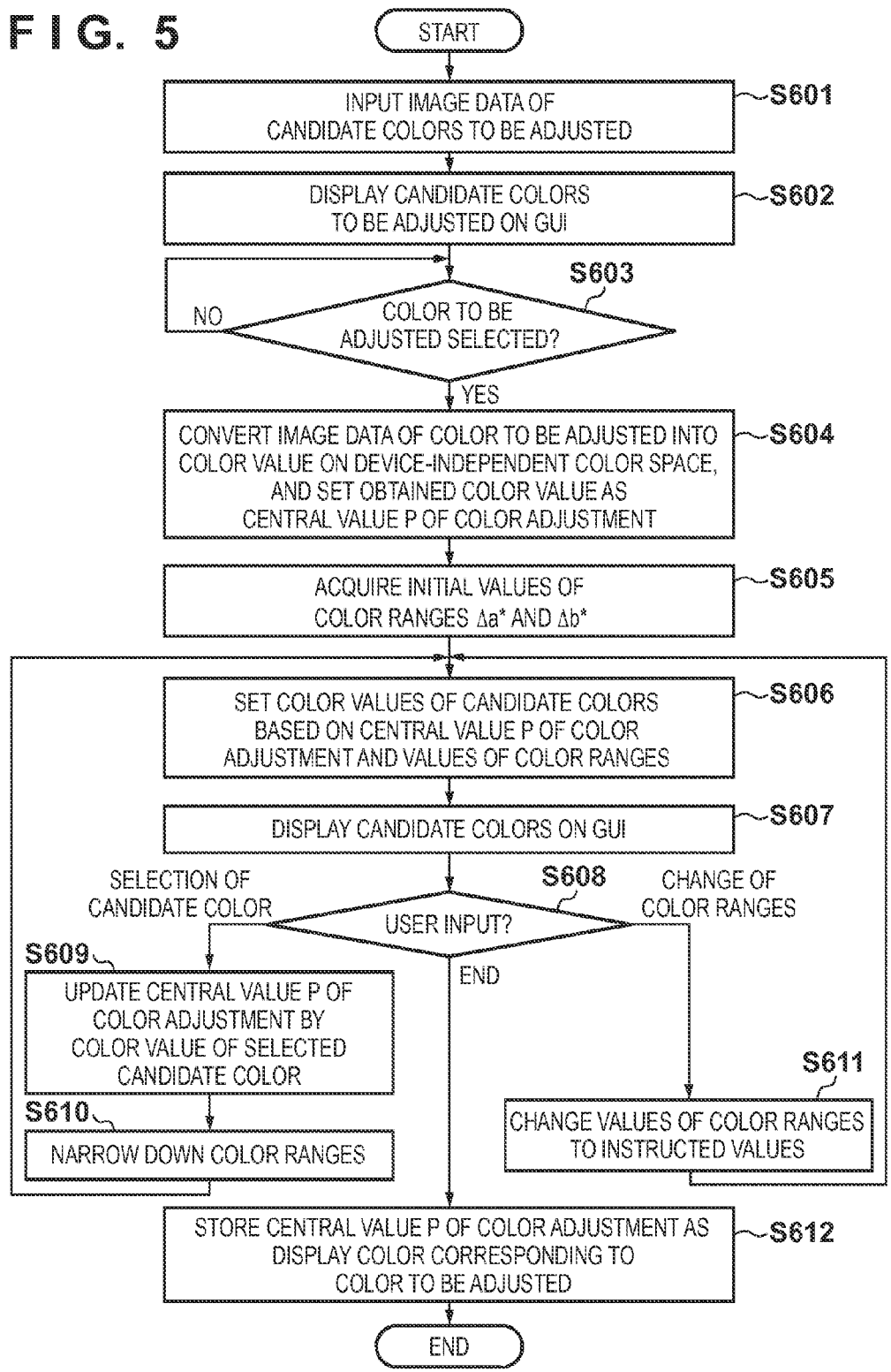
FIG. 5 is a flowchart for explaining color processing executed by a display controller.

The color processing executed by the display controller 102 will be described below with reference to the flowchart shown in FIG. 5. Note that a case will be described below wherein there are a plurality of candidate colors to be adjusted. However, when there is only one candidate color to be adjusted, the processing starts from step S604.

The display controller 102 inputs image data (for example, sRGB values) of candidate colors to be adjusted, which are stored in the main memory 202, HDD 203, or external storage device 208 (S601), and displays the candidate colors to be adjusted on the GUI (S602). Then, the display controller 102 waits for a user input (selection of a color to be adjusted) (S603). Note that when the monitor 205 is not an sRGB monitor, the display controller 102 executes color processing for converting sRGB values into device RGB values of the monitor.

After the color to be adjusted is selected, the display controller 102 converts image data of the color to be adjusted into color values on a device-independent color space, and sets the obtained color values as central values P(L0, a0, b0) of color adjustment (S604). For example, assuming that the image data is given by sRGB values of 8 bits per color, and the device-independent color space is a CIELab space, the image data is converted into color values by:

R'=R/255;
G'=G/255;
B'=B/255;
if (R'≤0.04045)
R"=R'/12.92;
else
R"={(R'+0.055)/1.055}$^\gamma$;
if (G'≤0.04045)
G"=G'/12.92;
else
G"={(G'+0.055)/1.055}$^\gamma$;
if (B'≤0.04045)
B"=B'/12.92;
else
B"={(B'+0.055)/1.055}$^\gamma$;

$$X=0.4124 \times R"+0.3576 \times G"+0.1805 \times B";$$

$$Y=0.2126 \times R"+0.7152 \times G"+0.0722 \times B";$$

$$Z=0.0193 \times R"+0.1192 \times G"+0.9505 \times B";$$

$$L^*=116 \times f(Y/Yn)-16;$$

$$a^*=500 \times \{f(X/Xn)-f(Y/Yn)\};$$

$$b^*=200 \times \{f(Y/Yn)-f(Z/Zn)\}; \quad (1)$$

where γ=2.4,
Xn, Yn, and Zn are X, Y, and Z values of a white point of the monitor 205, and
if (t>0.008856) f(t)=t$^{1/3}$,
if (t≤0.008856) f(t)=(903.3t+16)/116.

Expressions (1) represent the conversion example of sRGB values into CIEXYZ values. However, when image data is given by other device RGB values, a gamma value γ and matrix coefficients according to the color characteristic of that device can be set. Of course, using a three-dimensional lookup table (3DLUT) and interpolation calculations corresponding to the calculations described by expressions (1), sRGB values may be converted into XYZ values and Lab values.

Next, the display controller 102 acquires initial values Δa and Δb of color ranges Δa* and Δb* (S605), and sets color values of candidate colors based on the central values (L0, a0, b0) of color adjustment and the values of the color ranges (S606).

$$BT1=(L0,a0+\Delta a,b0+\Delta b);$$

$$BT2=(L0,a0+\Delta a,b0-\Delta b);$$

$$BT3=(L0,a0-\Delta a,b0-\Delta b);$$

$$BT4=(L0,a0-\Delta a,b0+\Delta b); \quad (2)$$

Figure 6A:
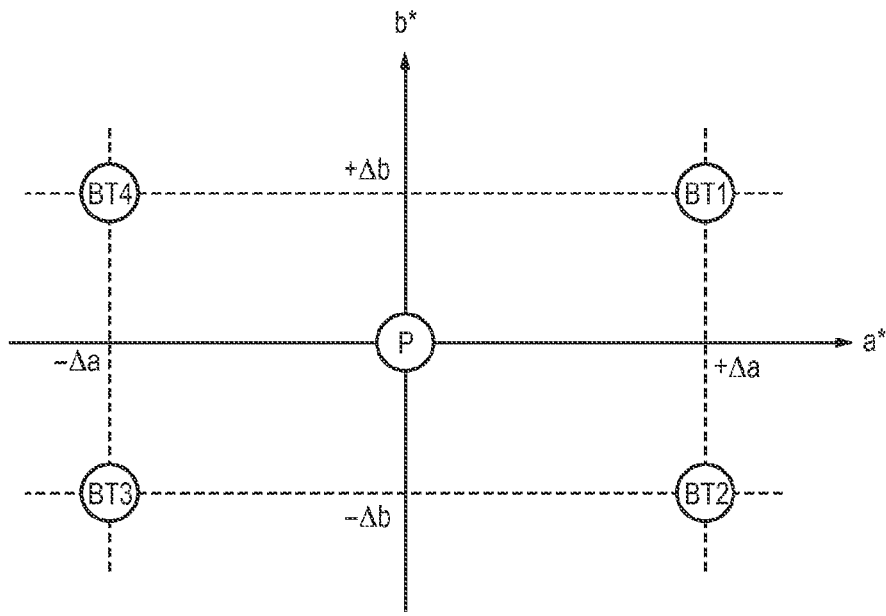
FIGS. 6A and 6B are views showing positions of a candidate colors on an a*b* space.
Figure 6B:
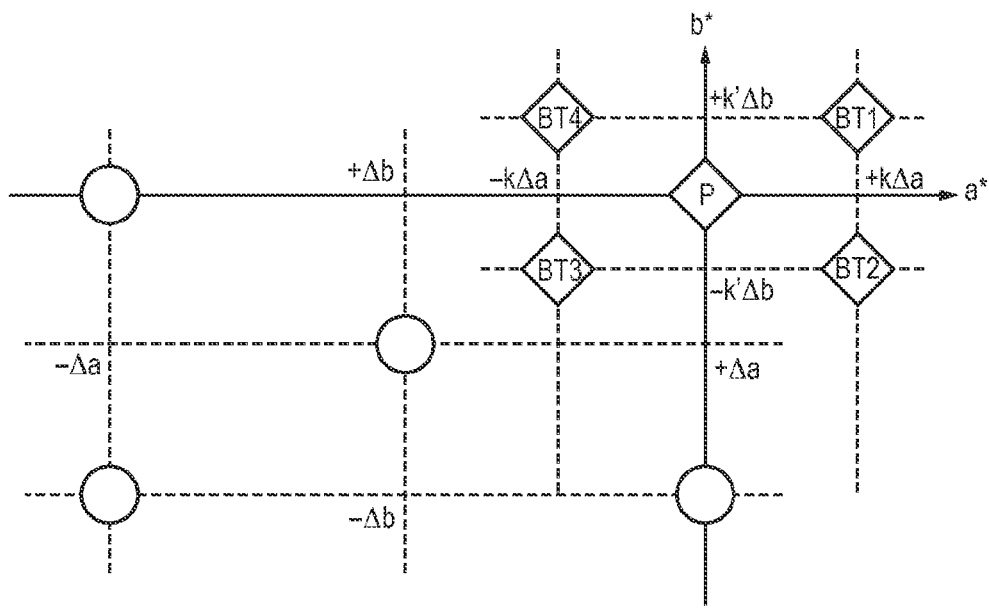

FIGS. 6A and 6B show positions of the candidate colors on an a*b* space. As shown in FIG. 6A, the display controller 102 displays four colors corresponding to vertices of a rectangle of a color range on the GUI as candidate colors (S607). In this case, the display controller 102 converts color values of the candidate colors into XYZ values, and further converts the XYZ values into device RGB values of the monitor 205.

Next, the display controller 102 waits for a user input (S608). If a candidate color is selected by the user input, the display controller 102 updates the central values P of color adjustment by the color values of the selected candidate color (S609). Note that to prepare for a case in which the user presses the "back" button, the central values P, the color values of the candidate colors, and the like are backed up to a predetermined area on the main memory 202. For example, when the user selects the candidate color BT1, the central values P are updated as follows.

$$P(L0,a0,b0) \rightarrow P(L0,a0+\Delta a,b0+\Delta b) \quad (3)$$

Next, the display controller 102 multiplies the color ranges by coefficients k and k' indicating predetermined ratios (S610), as described by:

$$\Delta a=k\Delta a;$$

$$\Delta b=k'\Delta b; \quad (4)$$

for 0≤k≤1, and
0<k'<1.

Then, the process returns to step S606.

That is, the display controller 102 updates the color values of the candidate colors by the updated central values P of color adjustment and the changed color ranges Δa and Δb (S606), and re-displays the updated color to be adjusted and candidate colors (S607).

$$BT1=\{L0,a0+(1+k)\Delta a,b0+(1+k')\Delta b\};$$

$$BT2=\{L0,a0+(1+k)\Delta a,b0-(1+k')\Delta b\};$$

$$BT3=\{L0,a0-(1+k)\Delta a,b0-(1+k')\Delta b\};$$

$$BT4=\{L0,a0-(1+k)\Delta a,b0+(1+k')\Delta b\}; \quad (5)$$

That is, as shown in FIG. 6B, the display controller 102 displays the updated central values P and colors corresponding to four points of the colors to be adjusted as new candidate colors on the GUI (S607). That is, an area bounded by the new candidate colors is narrower than that bounded by the candidate colors shown in FIG. 6A, since the color ranges are multiplied by the coefficients k and k'. FIG. 6B shows an example when the coefficients k and k' are k=k'=0.5. However the coefficients k and k' may assume the same value or different values.

If the color ranges are changed by the user input in step S608, the display controller 102 changes the values of the color ranges to instructed values (S611), and the process returns to step S606. That is, the display controller 102 updates color values of candidate colors by the central values P of color adjustment and the changed color ranges Δa and Δb (S606), and re-displays updated candidate colors (S607).

If the user presses the "end" button, the display controller 102 stores the central value P of color adjustment as a display color (Lab values) corresponding to the color to be adjusted (for example, sRGB values) in a predetermined area of the HDD 203 or external storage device 208 (S612), thus ending the processing.

The relationship between the color to be adjusted (for example, sRGB values) and corresponding display color (Lab values) is stored in a table associated with the monitor 205. Data of that table are reflected as those of grid points of, for example, a 3DLUT used in color processing upon displaying an image on the monitor 205, and when image data corresponding to the color to be adjusted is input, the corresponding display color is displayed on the monitor 205.

In this way, one color is selected from a plurality of candidate colors corresponding to a color to be adjusted, and a plurality of candidate colors are displayed to have the selected color as a color to be adjusted. In this case, the color range of candidate colors is narrowed down every time the candidate color is selected. Therefore, when the user repetitively selects a color close to a desired color, the color range is gradually narrowed down, and a desired display color corresponding to the color to be adjusted can be finally set. In this case, every time the candidate color is selected, colors of candidate colors become closer to each other, and the user can strictly compare color differences, thus enhancing the setting precision of the desired display color.

The case has been exemplified wherein the color adjustment is attained by only display on the monitor. However, the color adjustment can also be done while comparing a color displayed by another monitor or projector or that of a printed matter with a display color on the GUI, thus obtaining the same effects.

Second Embodiment

A color processing apparatus and color adjustment method according to the second embodiment of the present invention will be described below. Note that in the second embodiment, the same reference numerals denote the same components as those in the first embodiment, and a detailed description thereof will not be repeated.

The first embodiment has exemplified the case in which a color to be adjusted is selected from candidate colors to be adjusted displayed on the monitor 205. The second embodiment will exemplify a case in which a color of an adjustment target is acquired and is set as a color to be adjusted. Note that the color of the adjustment target includes that of a printed matter (that of a printer), that displayed by a device such as a monitor or projector, or that of various articles and objects.

Figure 7:
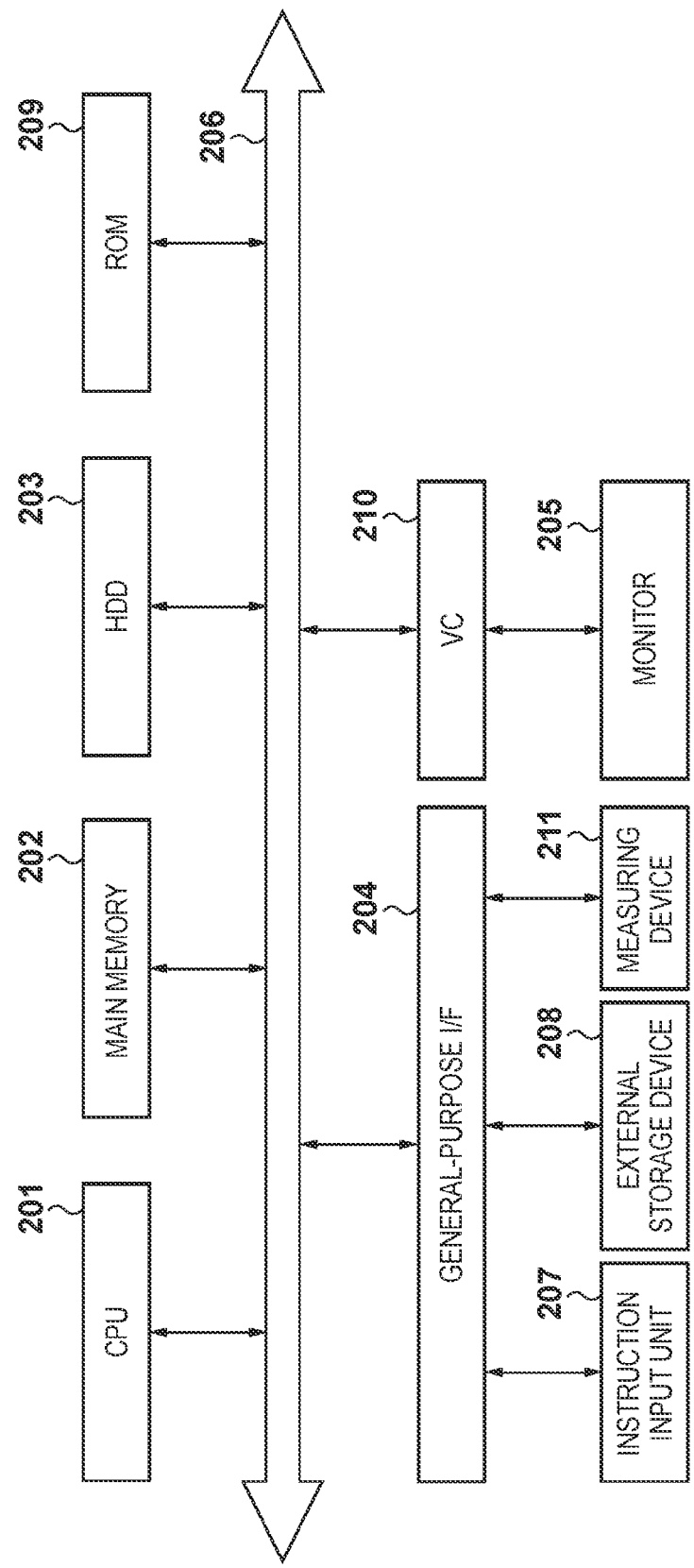
FIG. 7 is a block diagram showing the arrangement of a color processing apparatus according to the second embodiment.

The arrangement of the color processing apparatus according to the second embodiment will be described below with reference to the block diagram shown in FIG. 7. Unlike in the color processing apparatus shown in FIG. 1, a measuring device 211 is connected to a general-purpose I/F 204. Note that as the measuring device 211, an illuminometer, RGB sensor, spectral radiance meter, digital camera, and the like can be used. Upon reception of a measurement instruction of a CPU 201, the measuring device 211 measures a color of an adjustment target, and inputs colorimetric values (device RGB values, CIELab values, or CIEXYZ values) of that color to the color processing apparatus.

The functional arrangement of color processing associated with color adjustment according to the second embodiment will be described below with reference to the block diagram shown in FIG. 8. Note that the arrangement shown in FIG. 8 is implemented when a CPU 201 executes a color adjustment AP. The functional arrangement of the second embodiment includes a color acquisition unit 103 which acquires colorimetric values in addition to that shown in FIG. 4.

Figure 9:
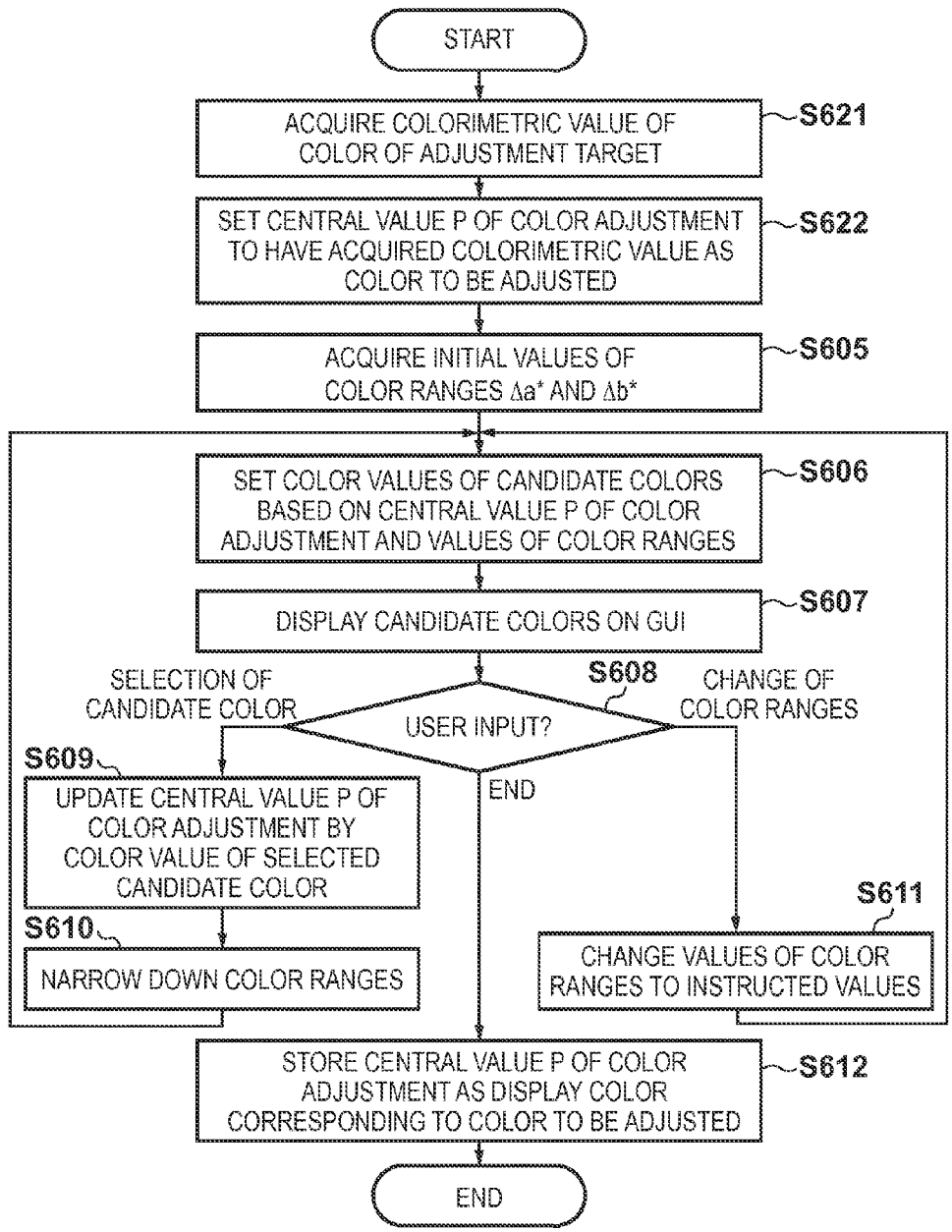
FIG. 9 is a flowchart for explaining color processing according to the second embodiment.

Color processing of the second embodiment will be described below with reference to the flowchart shown in FIG. 9. The color acquisition unit 103 controls the measuring device 211 to acquire colorimetric values of a color of an adjustment target (S621). A display controller 102 sets central values P of color adjustment to have the acquired colorimetric values as an initial color to be adjusted (S622). Note that when colorimetric values are device RGB values or XYZ values, the display controller 102 converts the colorimetric values into Lab values. The subsequent processes are the same as those in step S605 and subsequent steps shown in FIG. 5, and a detailed description thereof will not be repeated.

In this manner, the initial color to be adjusted is set based on the colorimetric values obtained by measuring the color of the adjustment target. For this reason, by setting the initial color to be adjusted in consideration of type of a device, article, or object as an adjustment target and the influence of environmental light, the load on the user who sets the initial color to be adjusted can be reduced.

Also, color adjustment may be done by only a display on the monitor. However, when a candidate color is selected with reference to a color of an adjustment target (a device display, printed mater, article, object, etc.), a display color closer to the color of the adjustment target can be set.

The case has been exemplified wherein device RGB values, XYZ values, Lab values, or the like are used as colorimetric values of a color of a device to be compared. However, in case of a light source color, a spectral radiance value can be used. Also, in case of an object color such as a printed matter, a spectral radiance value of environmental light or viewing light and a spectral reflectance value of the printed matter can be used.

Third Embodiment

A color processing apparatus and color adjustment method according to the third embodiment of the present invention will be described below. Note that in the third embodiment, the same reference numerals denote the same components as in the first and second embodiments, and a detailed description thereof will not be repeated.

The third embodiment will exemplify a case in which candidate colors are displayed by setting color ranges using information indicating personal differences of visual characteristics.

As the information indicating the personal differences of the visual characteristics, an HDD 203 or external storage device 208 stores personal color matching functions, that is, values which express visual sensitivities of persons with respect to light wavelengths. FIG. 10 shows representative color matching functions for four persons. Such data can be acquired by conducting color matching experiments for a plurality of examinees having representative visual characteristics (for example, a plurality of examinees of different ages).

Figure 11:
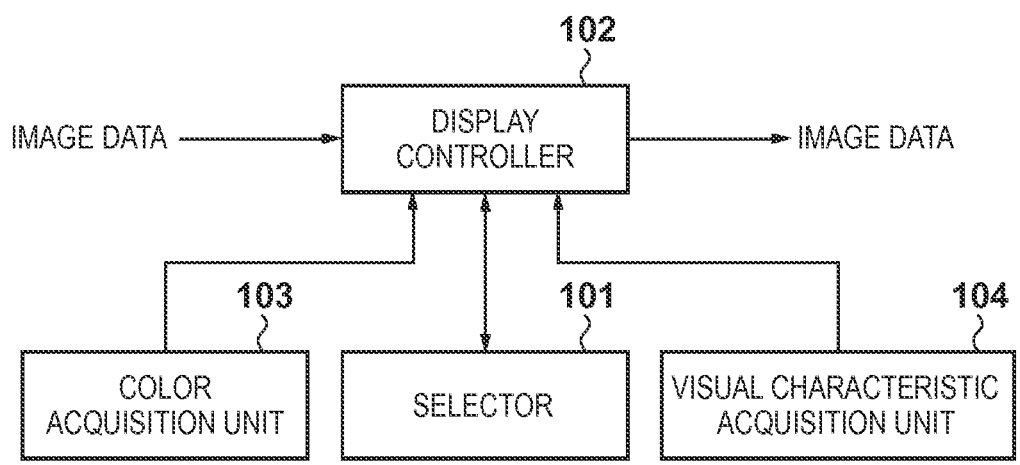
FIG. 11 is a block diagram for explaining the functional arrangement of color processing associated with color adjustment according to the third embodiment.

The functional arrangement of color processing associated with color adjustment according to the third embodiment will be described below with reference to the block diagram shown in FIG. 11. Note that the arrangement shown in FIG. 11 is implemented when a CPU 201 executes a color adjustment AP. The functional arrangement of the third embodiment includes a visual characteristic acquisition unit 104 which acquires representative color matching functions in addition to that shown in FIG. 8.

Figure 12:
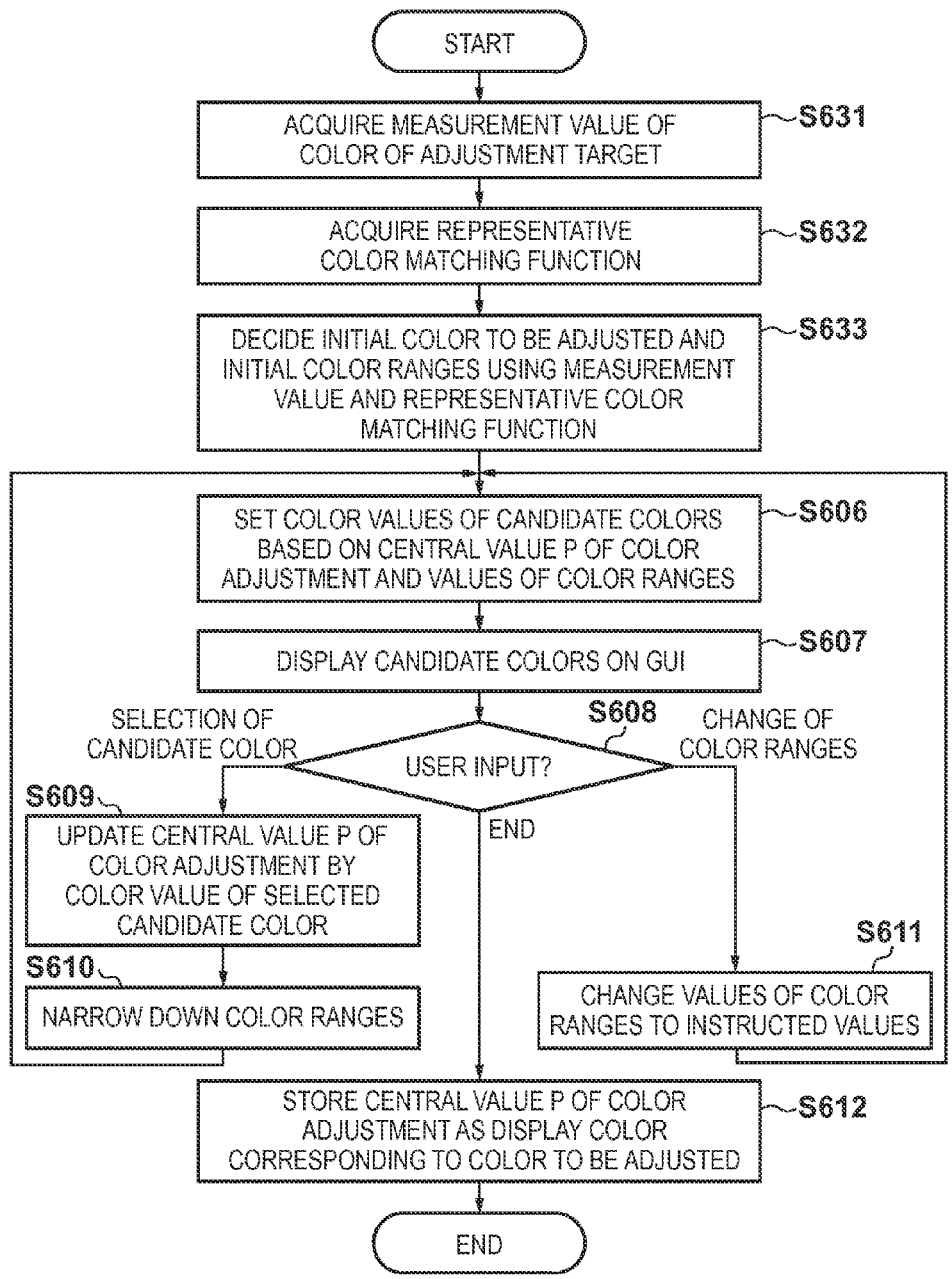
FIG. 12 is a flowchart for explaining color processing according to the third embodiment.

The color processing of the third embodiment will be described below with reference to the flowchart shown in FIG. 12. A color acquisition unit 103 controls a measuring device 211 to acquire a measurement value (a spectral radiance value or a spectral radiance value and spectral reflectance value) of a color to be adjusted (S631). The visual characteristic acquisition unit 104 acquires representative color matching functions stored in, for example, the HDD 203 (S632). A display controller 102 decides an initial color to be adjusted and color ranges using the acquired measurement value and the representative color matching functions (S633). The subsequent processes are the same as those in step S606 and subsequent steps shown in FIG. 5, and a detailed description thereof will not be repeated.

After a color matching function is acquired, the display controller 102 calculates XYZ values of a person A by:

$$X_{Av} = \Sigma_{\lambda=380}^{780} S(\lambda) x_A(\lambda) d\lambda;$$

$$Y_{Av} = \Sigma_{\lambda=380}^{780} S(\lambda) y_A(\lambda) d\lambda;$$

$$Z_{Av} = \Sigma_{\lambda=380}^{780} S(\lambda) z_A(\lambda) d\lambda; \quad (6)$$

where $S(\lambda)$ is a spectral radiance value of the measurement value, and $x_A(\lambda)$, $y_A(\lambda)$, and $z_A(\lambda)$ are color matching functions of the person A.

On the other hand, when the measurement value is a combination of a spectral radiance value and spectral reflectance, the display controller 102 calculates XYZ values of the person A by:

$$X_{Av} = \Sigma_{\lambda=380}^{780} S(\lambda) R(\lambda) x_A(\lambda) d\lambda;$$

$$Y_{Av} = \Sigma_{\lambda=380}^{780} S(\lambda) R(\lambda) y_A (\lambda) d\lambda;$$

$$Z_{Av} = \Sigma_{\lambda=380}^{780} S(\lambda) R(\lambda) z_A(\lambda) d\lambda; \quad (6')$$

where $R(\lambda)$ is a spectral reflectance value of the measurement value.

When a plurality of color matching functions are acquired, the display controller 102 similarly calculates their XYZ values. For example, when color matching functions of persons A, B, C, and D are acquired, the display controller 102 calculates the following XYZ values. Converting the XYZ values into the Lab values enables to obtain the Lab values corresponding to appearances of persons having the same visual characteristics as those of the persons A, B, C, and D.

A: $(X_{Av}, Y_{Av}, Z_{Av})$
$(L_{Av}, a_{Av}, b_{Av})$
B: $(X_{Bv}, Y_{Bv}, Z_{Bv})$
$(L_{Bv}, a_{Bv}, b_{Bv})$
C: $(X_{Cv}, Y_{Cv}, Z_{Cv})$
$(L_{Cv}, a_{Cv}, b_{Cv})$
D: $(X_{Dv}, Y_{Dv}, Z_{Dv})$
$(L_{Dv}, a_{Dv}, b_{Dv})$

Then, the display controller 102 decides Lab values of an initial color to be adjusted (central point P of adjustment) and initial values of color ranges, as given by:

$$L0 = (L_{Av} + L_{Bv} + L_{Cv} + L_{Dv})/4;$$

$$a0 = (a_{Av} + a_{Bv} + a_{Cv} + a_{Dv})/4;$$

$$b0 = (b_{Av} + b_{Bv} + b_{Cv} + b_{Dv})/4;$$

$$\Delta a = \{MAX(a_{Av}, a_{Bv}, a_{Cv}, a_{Dv})\}/2 - MIN(a_{Av}, a_{Bv}, a_{Cv}, a_{Dv});$$

$$\Delta b = \{MAX(b_{Av}, b_{Bv}, b_{Cv}, b_{Dv})\}/2 - MIN(b_{Av}, b_{Bv}, b_{Cv}, b_{Dv}); \quad (7)$$

Figure 13:
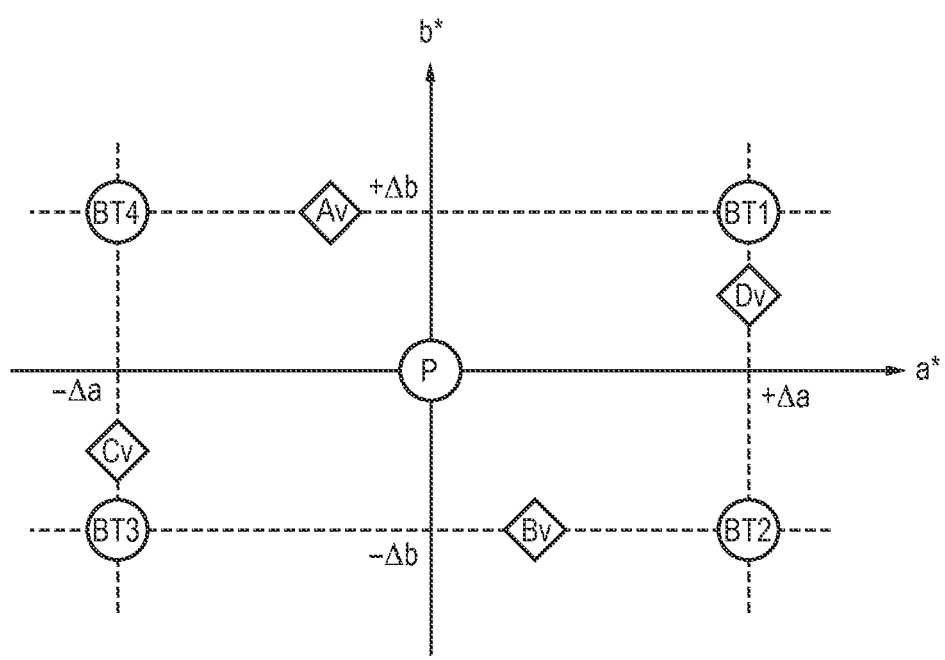
FIG. 13 is a view showing an example of an initial color to be adjusted (central point P of adjustment) and initial values of color ranges.

FIG. 13 shows an example of the initial color to be adjusted (central point P of adjustment) and initial values of the color ranges. Since the central point P and color ranges are decided from Av, Bv, Cv, and Dv which represent chromaticity values a* and b* calculated from the representative color matching functions, candidate colors of the color ranges which cover a range of appearance expected from the visual characteristics can be obtained, as shown in FIG. 13. Note that initial candidate colors corresponding to Av, Bv, Cv, and Dv may be used as candidate colors in place of colors BT1 to BT4.

In this manner, candidate colors are set using personal differences of the visual characteristics, and candidate colors based on appearances of persons having representative visual characteristics are displayed. Therefore, candidate colors close to the visual characteristic of the user can be initially displayed.

The case has been exemplified wherein personal color matching functions are used as personal visual characteristics. For example, sensitivity characteristics of LMS cones, correction coefficients for color matching functions defined by CIE1931, or a*b* distribution information based on personal visual characteristics may be used to obtain the same effects.

Fourth Embodiment

Color processing associated with color adjustment according to the fourth embodiment of the present invention will be described below. Note that in the fourth embodiment, the same reference numerals denote the same components as in the first to third embodiments, and a detailed description thereof will not be repeated.

The third embodiment has exemplified the case in which candidate colors are set using representative personal color matching functions as visual characteristics. The fourth embodiment will exemplify a case in which candidate colors are set using color matching functions according to viewing angles. Note that it is known that a color matching function changes according to a viewing angle (for example, see CIE170-1 (variable models of visual characteristics) and Japanese Patent Laid-Open No. 2011-515894).

Color matching functions according to viewing angles will be described below with reference to FIG. 14. The color matching functions shown in FIG. 14 are acquired from observers having representative visual characteristics by conducting color matching experiments for respective representative viewing angles (for example, 2°, 4°, and 10°). That is, in the fourth embodiment, color matching functions according to the viewing angles for, for example, four persons are stored in the HDD 203 or external storage device 208.

Figure 15:
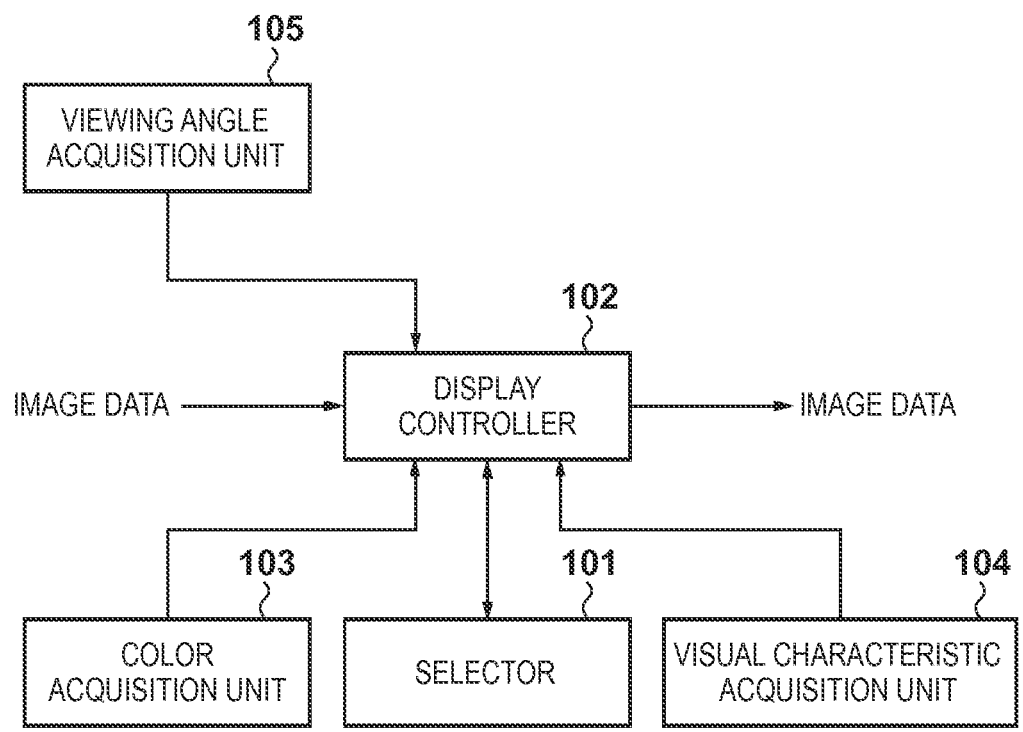
FIG. 15 is a block diagram for explaining the functional arrangement of color processing associated with color adjustment according to the fourth embodiment.

The functional arrangement of the color processing associated with color adjustment according to the fourth embodiment will be described below with reference to the block diagram shown in FIG. 15. Note that the arrangement shown in FIG. 15 is implemented when a CPU 201 executes a color adjustment AP. The functional arrangement of the fourth embodiment includes a viewing angle acquisition unit 105 which acquires viewing angles in addition to that shown in FIG. 11.

Figure 16:
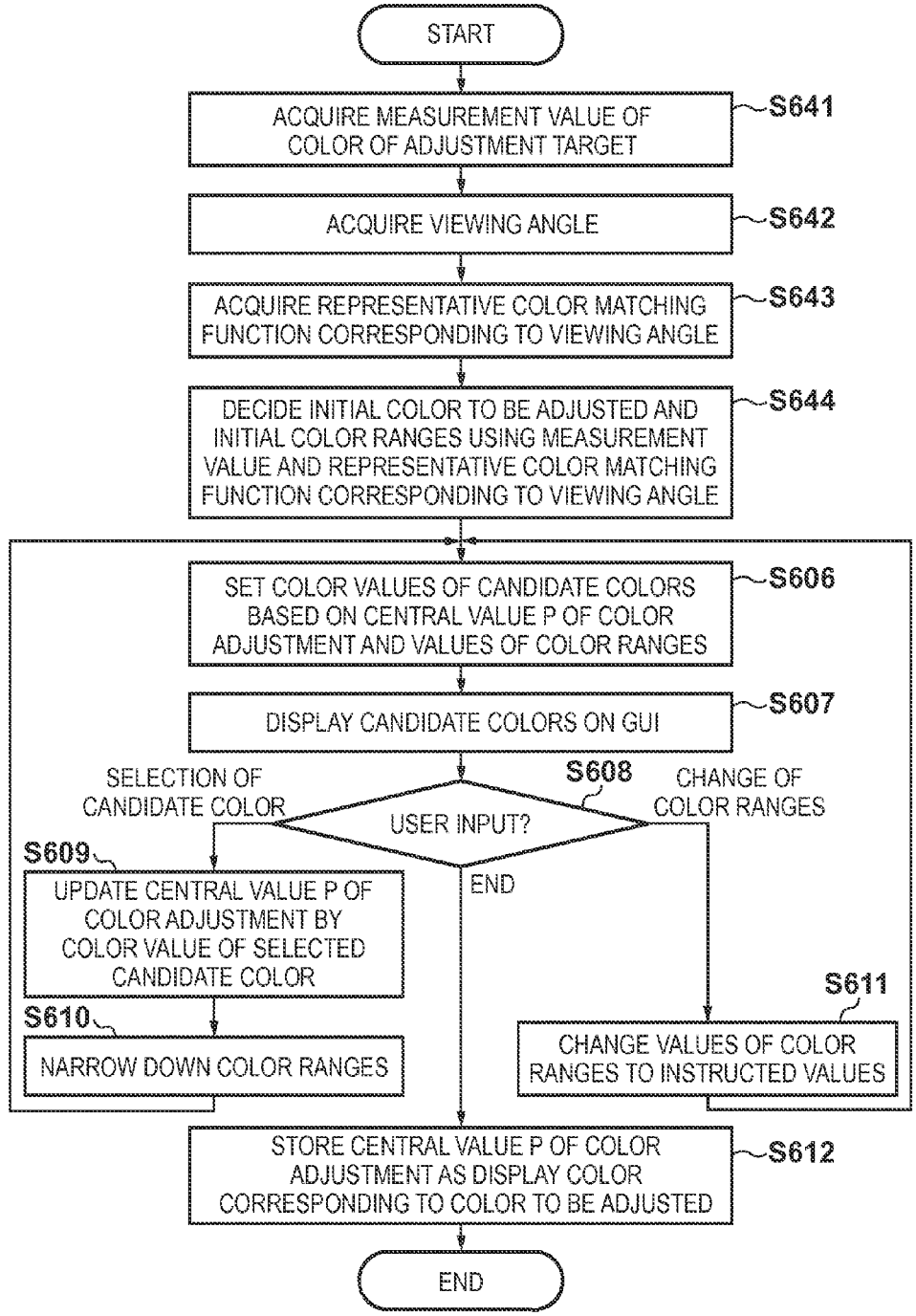
FIG. 16 is a flowchart for explaining color processing according to the fourth embodiment.

The color processing of the fourth embodiment will be described below with reference to the flowchart shown in FIG. 16. A color acquisition unit 103 controls a measuring device 211 to acquire a measurement value (a spectral radiance value or a spectral radiance value and spectral reflectance value) of a color to be adjusted (S641).

Figure 17:
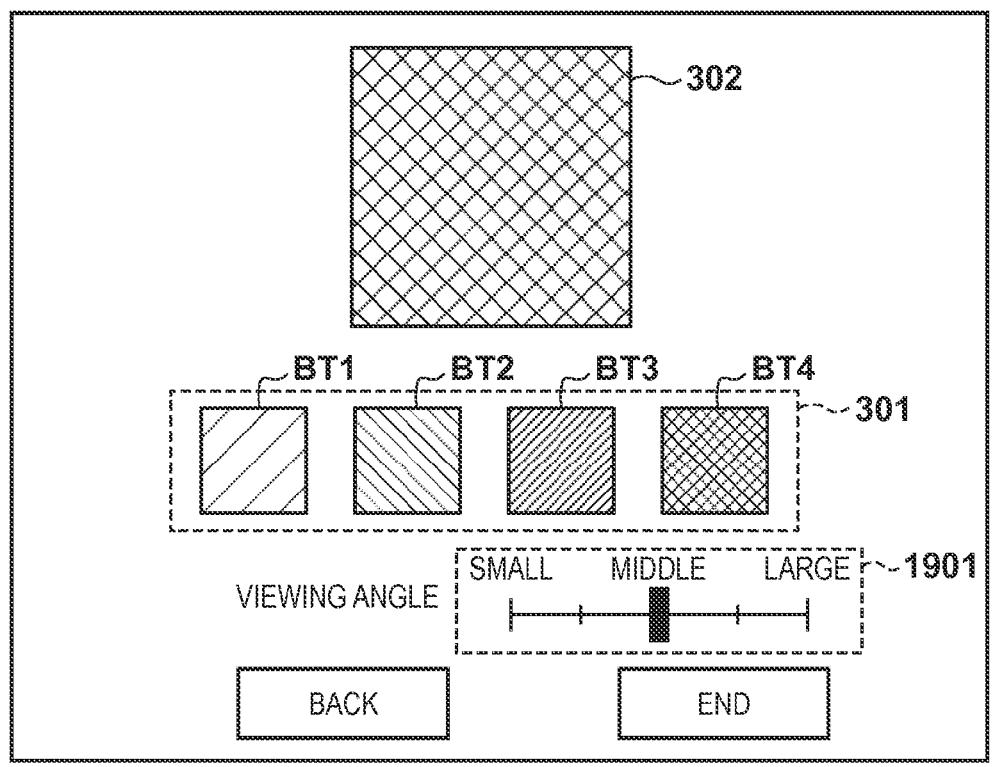
FIG. 17 is a view showing an example of a GUI according to the fourth embodiment.

Next, the viewing angle acquisition unit 105 acquires a viewing angle from a GUI (S642). FIG. 17 shows an example of a GUI of the fourth embodiment. The user inputs a viewing angle by operating a sliding bar 1901 used to set a viewing angle on the GUI. Note that "small", "middle", and "large" of the sliding bar 1901 respectively correspond to, for example, 2°, 4°, and 10°. Also, when an intermediate angle between "small" and "middle" is set, for example, color matching functions for 3° obtained by interpolating those for 2° and 4° are used. Likewise, when an intermediate angle between "middle" and "large" is set, color matching functions for 7° obtained by interpolating those for 4° and 10° are used.

Next, a visual characteristic acquisition unit 104 acquires representative color matching functions corresponding to the set viewing angle from, for example, the HDD 203 (S643). Then, a display controller 102 decides an initial color to be adjusted and color ranges using the acquired measurement value and the representative color matching functions corresponding to the set viewing angle (S644). The subsequent processes are the same as those in step S606 and subsequent steps shown in FIG. 5, and a detailed description thereof will not be repeated.

Figure 18:
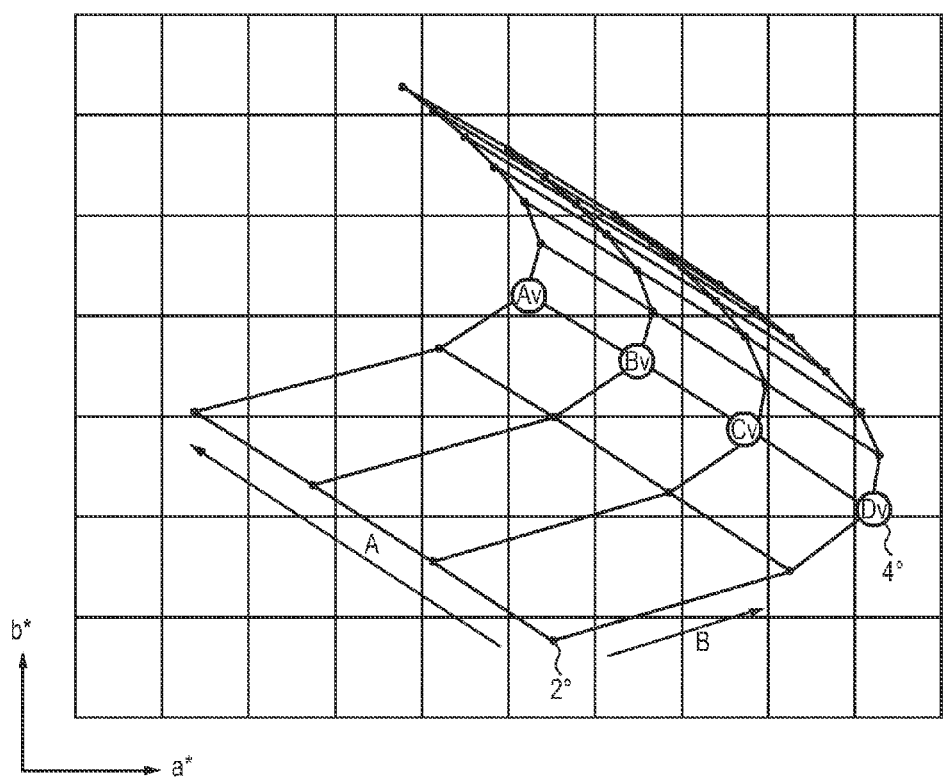
FIG. 18 is a view showing a distribution of chromaticity values a* and b*, which reflect personal differences of visual characteristics and viewing angles to a measurement value of a color to be adjusted.

FIG. 18 shows a distribution of chromaticity values a* and b* which reflect personal differences of visual characteristics and viewing angles to the measurement value of the color to be adjusted. That is, when a spectral radiance value as the measurement value of the color to be adjusted is converted into Lab values by multiplying it by representative color matching functions corresponding to a viewing angle, the chromaticity distribution shown in FIG. 18 is obtained. Note that FIG. 18 shows an example of chromaticity values Av, Bv, Cv, and Dv when a viewing angle=4° is set. However, since chromaticity calculations have already been explained in the third embodiment, a description thereof will not be given. An arrow A shown in FIG. 18 indicates a change direction of color appearance depending on personal differences, and an arrow B indicates a change direction of color appearance depending on viewing angles.

In this manner, by setting candidate colors based on the personal differences of the visual characteristics and the viewing angles, the candidate colors based on the appearances of persons having representative visual characteristics and viewing angles are displayed. Therefore, candidate colors close to the visual characteristic and viewing angle of the user can be initially displayed.

The case has been exemplified wherein a viewing angle is acquired using the GUI. For example, a viewing angle may be acquired based on movement of a visual line using an eye tracker. Alternatively, a viewing angle may be calculated by measuring a distance between the user and a monitor 205 using a sensor.

Modification of Embodiments

The above embodiments have exemplified the case in which the CIELab space is used as a color space used to decide candidate colors. However, other device-independent color spaces such as a CIELuv space, CIECAM02 space, and LCH space can be used.

The above embodiments have exemplified the case in which chromaticity values a* and b* are changed while fixing a lightness value L*. However, color adjustment on a three-dimensional space on which a lightness value L* is also changed is also available. In this case, for example, eight candidate colors need only be arranged for the color P to be adjusted.

The above embodiments have exemplified the case in which candidate colors are arranged on the vertices of the rectangle of the chromaticity range having the color to be adjusted as the center. For example, candidate colors may be arranged on vertices of a rhombus having the color to be adjusted as the center (see FIG. 3A).

The above embodiments have exemplified the case in which the vertices are used to define the color range. However, points which define the color range need only be located on boundaries of the color range.

The above embodiments have exemplified the case in which the number of candidate colors is four. However, the number of candidate colors is not particularly limited as long as two or more colors are displayed. However, since too many candidate colors confuse the user, an upper limit is about 10 colors.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-112686 filed May 16, 2012 which is hereby incorporated by reference herein in its entirety.

The following statements form part of the description. The claims follow these statements and are labeled as such.

1. A color processing apparatus for performing an adjustment of display color of a display device, the apparatus comprising:
   a display controller configured to display, on the display device, a color to be adjusted, which is designated by a user and is required to adjust the display color, and a plurality of candidate colors, which define a first color range including the color to be adjusted; and
   a selector configured to select one of the plurality of candidate colors based on a user instruction,
   characterized in that the display controller displays the selected candidate color as a color to be adjusted on the display device, and displays, on the display device, a plurality of candidate colors which define a second color range including the color to be adjusted,
   wherein the second color range is obtained by narrowing down the first color range.
2. The apparatus according to statement 1, wherein the candidate colors correspond to vertices of the color range.
3. The apparatus according to preceding statement, wherein the color to be adjusted is located at a center of each of the first and second color ranges.
4. The apparatus according to preceding statement, wherein each of the first and second color ranges is a chromaticity range on a device-independent color space, and the display controller sets a color range which is obtained by narrowing down the chromaticity range at a predetermined ratio every time the candidate color is selected.

5. The apparatus according to statement 4, further comprising an input section configured to allow the user to input the chromaticity range,
wherein in a case where the chromaticity range is input, the display controller displays, on the display device, a plurality of colors corresponding to vertices of the input chromaticity range with respect to the color to be adjusted.

6. The apparatus according to preceding statement, further comprising a first acquisition unit configured to acquire the color to be adjusted according to a user instruction.

7. The apparatus according to statement 6, further comprising a second acquisition unit configured to acquire a plurality of representative visual characteristics,
wherein the display controller decides the first and second color ranges based on the plurality of visual characteristics.

8. The apparatus according to statement 7, further comprising a third acquisition unit configured to acquire a viewing angle of an observer who observes the display device,
wherein the second acquisition unit acquires the plurality of visual characteristics based on the viewing angle.

9. The apparatus according to statement 7 or 8, wherein the visual characteristic is expressed as a color matching function.

10. The apparatus according to any one of statements 1 to 5, wherein the display controller displays a plurality of candidate colors to be adjusted on the display device, and
wherein the selector selects one of the plurality of candidate colors to be adjusted as the color to be adjusted based on a user instruction.

11. A color processing method of performing an adjustment of display color of a display device (205), the method comprising the steps of:
displaying, on the display device, a color to be adjusted, which is designated by a user and is required to adjust the display color, and a plurality of candidate colors, which define a first color range including the color to be adjusted; and
selecting one of the plurality of candidate colors based on a user instruction,
characterized in that, in the displaying step, the selected candidate color is displayed as a color to be adjusted on the display device, and a plurality of candidate colors, which define a second color range including the color to be adjusted, are displayed on the display device,
wherein the second color range is obtained by narrowing down the first color range.

12. A storage medium storing program code for programming processing means to carry out a method in accordance with statement 11.

What is claimed is:

1. A color processing apparatus for performing an adjustment of display color of a display device, the apparatus comprising:
a display controller configured to display, on the display device, a target color to be adjusted, which can be designated by a user, and a plurality of candidate colors that may be selected by a user in preference to the target color, which candidate colors define a first color range including the target color to be adjusted; and
a selector configured to select one of the plurality of candidate colors based on a user instruction,
wherein the display controller displays, subsequent to selection of one of the candidate colors, on the display device a further plurality of candidate colors which define a second color range including the selected candidate color as a second target color to be adjusted, and
wherein (a) the second color range is narrower than the first color range, (b) the candidate colors define vertices of the color range, (c) the target colors to be adjusted are respectively located at a center of each of the first and second color ranges, (d) each of the first and second color ranges is a chromaticity range on a device-independent color space, and (e) the display controller sets a narrower second color range by narrowing down the previous second color range at a predetermined ratio in response to a selection of a candidate color in the second color range.

2. The apparatus according to claim 1, further comprising an input section configured to allow the user to input the chromaticity range,
wherein, in a case where the chromaticity range is input, the display controller displays, on the display device, a plurality of candidate colors corresponding to vertices of the input chromaticity range with respect to the target color to be adjusted.

3. The apparatus according to claim 1, further comprising a first acquisition unit configured to acquire the target color to be adjusted according to a user instruction.

4. The apparatus according to claim 3, further comprising a second acquisition unit configured to acquire a plurality of representative visual characteristics,
wherein the display controller decides the first and second color ranges based on the plurality of visual characteristics.

5. The apparatus according to claim 4, further comprising a third acquisition unit configured to acquire a viewing angle of an observer who observes the display device,
wherein the second acquisition unit acquires the plurality of visual characteristics based on the viewing angle.

6. The apparatus according to claim 4, wherein the visual characteristic is expressed as a color matching function.

7. A color processing method of performing an adjustment of display color of a display device, the method comprising:
displaying, on the display device, a target color to be adjusted, which can be designated by a user, and a plurality of candidate colors that may be selected in preference to the target color, which candidate colors define a first color range including the target color to be adjusted; and
selecting one of the plurality of candidate colors based on a user instruction,
wherein, subsequent to the selection of one of the candidate colors, the selected candidate color is displayed as a second target color to be adjusted on the display device, and a further plurality of candidate colors, which define a second color range including the second target color to be adjusted, are displayed on the display device, and
wherein (a) the second color range is narrower than the first color range, (b) the candidate colors define vertices of the color range, (c) the target colors to be adjusted are respectively located at a center of each of the first and second color ranges, (d) each of the first and second color ranges is a chromaticity range on a device-independent color space, and (e) a narrower second color range is set by narrowing down the previous second color range at a predetermined ratio in response to a selection of a candidate color in the second color range.

8. A non-transitory computer readable medium storing a computer-executable program for causing a computer to perform a color processing method, the method comprising:
displaying, on the display device, a target color to be adjusted, which can be designated by a user, and a plurality of candidate colors that may be selected in preference to the target color, which candidate colors define a first color range including the target color to be adjusted; and selecting one of the plurality of candidate colors based on a user instruction, wherein, subsequent to the selection of one of the candidate colors, the selected candidate color is displayed as a second target color to be adjusted on the display device, and a further plurality of candidate colors, which define a second color range including the second target color to be adjusted, are displayed on the display device, and wherein (a) the second color range is narrower than the first color range, (b) the candidate colors define vertices of the color range, (c) the target colors to be adjusted are respectively located at a center of each of the first and second color ranges, (d) each of the first and second color ranges is a chromaticity range on a device-independent color space, and (e) a narrower second color range is set by narrowing down the previous second color range at a predetermined ratio in response to a selection of a candidate color in the second color range.

* * * * *